Figure 1:
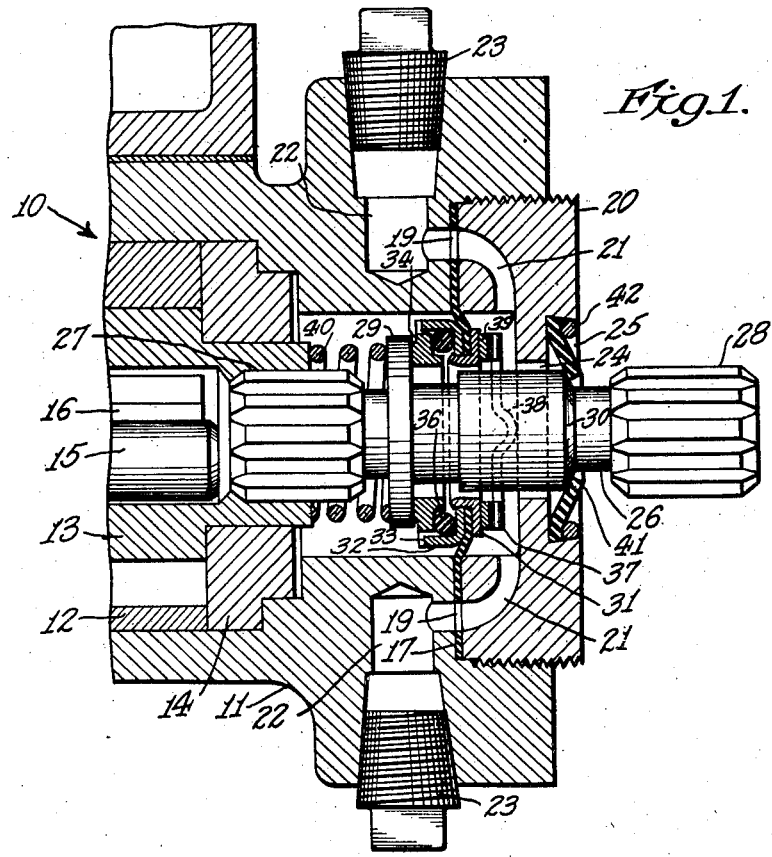

March 23, 1948.  A. G. SCHLOSSER  2,438,457

SHAFT SEAL

Filed Sept. 11, 1945

INVENTOR.
ARTHUR G. SCHLOSSER
BY
F. J. Pisarra
ATTORNEY

Patented Mar. 23, 1948

2,438,457

UNITED STATES PATENT OFFICE 2,438,457

SHAFT SEAL

Arthur G. Schlosser, Detroit, Mich., assignor to Candler-Hill Corporation, Detroit, Mich., a corporation of Michigan Application September 11, 1945, Serial No. 615,640

3 Claims. (Cl. 286—11)

This invention relates to a sealing means and, in one of its more specific aspects, to a seal for effectively preventing the escape of fluid past the shaft of a rotary pump or the like.

While the instant invention may be advantageously employed to provide a desirable fluid seal with various types of devices, it possesses singular utility in sealing the shafts of relatively high pressure and high speed rotary pumps of the character employed in supplying fluid fuel to the engines of aircraft. It is highly important that an effective seal be maintained at all times in pumps of this type, lest escaping fuel create a dangerous fire hazard. A number of advances have been made in this field in recent years. However, it has been ascertained that although present-day sealing devices for shafts of fuel pumps may be used with fairly good success in supplying fuel at usual pressures, the efficiency of known seals is materially reduced when the pressure developed within the pump exceeds, for example, about 40 pounds per square inch. The sealing device of the present invention obviates many of the difficulties experienced heretofore in that it provides means for effecting an adequate seal in rotary pumps operating under either low or high pressures. Moreover, my sealing means, by virtue of its form of construction, automatically accommodates itself to flexing, whipping, thrusts or vibrations created in the shaft under rigorous operating conditions without noticeable diminution in efficiency or effectiveness.

It is the primary object of this invention to provide a means for sealing a rotary shaft in an effective and trouble-free manner under a wide range of pressure conditions.

This invention has for another object the provision of a simple, compact sealing device for the shaft of a rotary fuel pump, so constructed and arranged as to be unaffected due to whipping, flexing, thrusts or vibrations imparted to the shaft in operation.

This invention has for a further object the provision of a seal of the character indicated that is relatively inexpensive and that may be readily assembled, repaired or replaced as required.

These, as well as other objects, together with the advantages attainable by the practice of my instant invention, will be readily apparent to persons skilled in the art by reference to the following detailed description, taken in conjunction with the annexed drawing, that respectively describe and illustrate a preferred embodiment of the invention.

Figure 2:
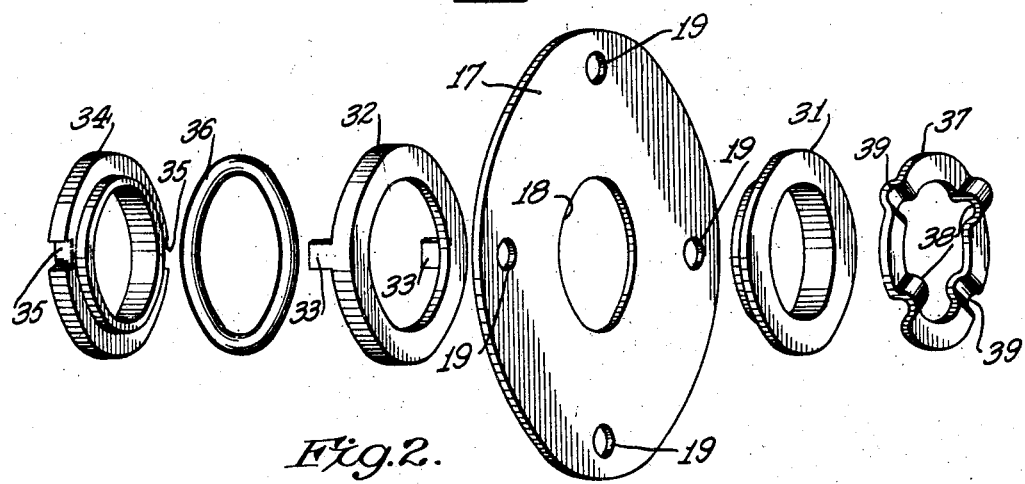

In the drawing:

Figure 1 is a view in central longitudinal vertical cross section through an end portion of a positive displacement rotary pump assembly, having the seal of this invention incorporated therein; and Figure 2 is an exploded perspective view of several of the elements that cooperate with other elements depicted in Figure 1 to form the seal of this invention.

Referring now to the drawing, wherein like reference numerals denote corresponding parts in both views, and more particularly to Figure 1, there is shown a portion of a positive displacement rotary pump 10 that may be the same as or similar to the pump disclosed in my pending application Ser. No. 567,589, filed December 11, 1944, now abandoned. The pump may include a casing or housing 11 having a hollow liner 12, within which a hollow rotor 13 mounted in a bearing 14 is adapted to rotate. Hollow rotor 13 contains a conventional cylindrical vane spacer pin 15 and the usual reciprocable vanes, one of which is indicated at 16.

A diaphragm 17, having a central aperture 18 and a series of radially spaced ports 19, is clamped across the interior of housing 11 by an externally threaded plug 20 that serves as a closure for the housing and that is provided with a series of passages 21, each of which communicates with a corresponding port 19 in the diaphragm. Drain passages 22 in housing 11 also communicate with ports 19 in the diaphragm and are provided with plugs 23. In practice, lowermost plug 23 is removed and a conduit is connected to its passage 22 for transmitting any fuel that may seep past the seal of this invention back to storage or for disposal. Plug 20 is also provided with a central shaft receiving opening 24 and a concentric frustro conical recess 25.

A shaft 26, extending through opening 24 in plug 20, is splined at its opposite ends 27 and 28 for respectively effecting coupling engagement with rotor 13 and a prime mover, such as an electric motor (not shown). It will be observed that the splined connection between shaft 26 and rotor 13 permits of relative axial movement of the shaft with respect to the rotor. The shaft is machined on several diameters to provide a flange 29 and a frustro conical shoulder 30.

A grommet 31 bears against the outer face of diaphragm 17 and extends through aperture 18 therein. A grommet cup 32, having a pair of diametrically opposed extensions or teats 33 is snapped on over the free end of the grommet 31 and bears against the other face of the diaphragm. A floating bushing 34, preferably composed of a low friction material containing carbon, embraces shaft 26 and is disposed immediately adjacent the outer face of flange 29. Bushing 34 is provided with a pair of diametrically opposed notches 35 for receiving teats 33 of the grommet cup to permit relative axial movement but to prevent relative rotational movement therebetween. Intermediate the outer face of bushing 34 and grommet cup 32 is a ring 36 of a flexible distortable material, such as a suitable synthetic rubber, that is resistant to the action of hydrocarbon fluid fuels. Interposed between grommet 31 and plug 20 is a wabble washer, consisting of a ring 37 having pairs of diametrically opposed offsets 38 and 39, formed on its opposite faces, to permit misalignment, flexing, wabbling or whipping of the shaft without breaking the seal during operation. A compression spring 40 concentric with shaft 26 bears against an end of hollow rotor 13 and a face of flange 29 to normally and yieldingly impart a thrust to the shaft toward the right, as viewed in Figure 1, to thereby maintain pressure contact simultaneously between flange 29 and bushing 34, between bushing 34 and distortable ring 36, and between distortable ring 36 and grommet cup 32.

As will be evident to persons versed in the art, the above-described devices provide an effective and adequate seal to prevent the escape of fluid being handled by the pump, and further that the seal is virtually unaffected by any misalignment, whipping, and the like, of the shaft.

An auxiliary seal is provided as a safety measure and, as illustrated, may include a flexible ring 41 having its marginal portion positioned and maintained in recess 25 by a resilient split ring 42, and having its inner portion bearing against shoulder 30 on the shaft.

From the foregoing, it is believed that the construction, operation, and advantages of my present invention will be readily comprehended by persons skilled in the art. It is to be clearly understood, however, that the form of my invention herewith shown and described is to be taken as a preferred example of the same and that various changes in the shape, size and arrangement of parts may be resorted to without departing from the spirit of my invention as defined by the appended claims.

I claim:

1. In a seal of the character described, the combination comprising a housing, a flexible diaphragm disposed across the interior of the housing, a rigid ring sealed to and defining an opening through the diaphragm, a shaft extending through the housing and the opening, a flange on the shaft to one side of the diaphragm, a bushing surrounding the shaft on the side of the flange adjacent the ring, means permitting relative axial movement but positively preventing relative rotational movement between the bushing and the ring, a flexible distortable ring surrounding the shaft intermediate the bushing and the rigid ring, and means for maintaining pressure contact simultaneously between the flange and the bushing, between the bushing and the distortable ring, and between the distortable ring and the rigid ring.

2. In a seal of the character described, the combination comprising a housing, a flexible diaphragm disposed across the interior of the housing, rigid means defining an opening through the diaphragm and comprising a grommet bearing against one face of the diaphragm and a grommet cup bearing against the other face of the diaphragm and secured in clamping engagement with the grommet and the diaphragm to form a fluid-tight seal with the diaphragm, a shaft extending through the housing and the grommet, a flange on the shaft to the grommet cup side of the diaphragm, a bushing surrounding the shaft on the side of the flange adjacent the diaphragm, means permitting relative axial movement but positively preventing relative rotational movement between the bushing and the grommet cup, a flexible distortable ring surrounding the shaft intermediate the bushing and the grommet cup, and means for maintaining pressure contact simultaneously between the flange and the bushing, between the bushing and the distortable ring, and between the distortable ring and the grommet cup.

3. In a seal of the character described, the combination comprising a housing, a flexible diaphragm disposed across the interior of the housing, rigid means defining an opening through the diaphragm and comprising a grommet bearing against one face of the diaphragm and a grommet cup bearing against the other face of the diaphragm and engaging the grommet in a manner to form a fluid-tight seal with the diaphragm, a shaft extending through the housing and the grommet, a flange on the shaft to the grommet cup side of the diaphragm, a bushing surrounding the shaft on the side of the flange adjacent the diaphragm, said bushing having a pair of diametrically opposed openings formed therein, a pair of diametrically opposed members carried by the grommet cup and registering with the openings in the bushing to permit relative axial movement but prevent relative rotational movement between the bushing and the grommet cup, a flexible distortable ring surrounding the shaft intermediate the bushing and the grommet cup, and means for maintaining pressure contact simultaneously between the flange and the bushing, between the bushing and the distortable ring, and between the distortable ring and the grommet cup.

ARTHUR G. SCHLOSSER.

REFERENCES CITED

The following references are of record in the file of this patent:

UNITED STATES PATENTS

| Number | Name | Date |
|---|---|---|
| 1,746,068 | Barnes | Feb. 4, 1930 |
| 1,950,852 | Kuehn et al. | Mar. 13, 1934 |
| 2,233,599 | Gilbert | Mar. 4, 1941 |
| 2,404,690 | Caserta | July 23, 1946 |